United States Patent [19]

Koulopoulos et al.

[11] Patent Number: 5,412,638
[45] Date of Patent: May 2, 1995

[54] METHOD FOR CORRECTING ERRORS IN DIGITAL AUDIO DATA

[75] Inventors: Michael A. Koulopoulos, Andover; Praduman Jain, Lowell, both of Mass.; Sriram Jayasimha, Hyberabad, India

[73] Assignee: Vimak Corporation, Woburn, Mass.

[21] Appl. No.: 71,505

[22] Filed: Jun. 2, 1993

[51] Int. Cl.$^6$ .............................................. G11B 5/035
[52] U.S. Cl. ........................................ 369/59; 360/65
[58] Field of Search ............... 360/65, 53; 369/59, 369/60, 53; 375/13, 14, 103

[56] References Cited

U.S. PATENT DOCUMENTS

| | | | |
|---|---|---|---|
| 4,121,295 | 10/1978 | Witt | 360/65 X |
| 4,716,472 | 12/1987 | McNally | 360/10.1 |
| 5,029,167 | 7/1991 | Amon et al. | 375/14 X |
| 5,031,195 | 7/1991 | Chevillat et al. | 375/14 |
| 5,107,378 | 4/1992 | Cronch et al. | 360/65 X |
| 5,208,837 | 5/1993 | Richey | 375/103 |
| 5,222,144 | 6/1993 | Whikehart | 375/39 X |
| 5,247,401 | 9/1993 | Umemoto et al. | 360/65 |
| 5,260,800 | 11/1993 | Sturm et al. | 360/32 X |

OTHER PUBLICATIONS

Adams, Robert W.; "Non-Uniform Sampling of Audio Signals"; Presented at Audio Engineering Society Convention, Oct. 1991.

*Primary Examiner*—Donald Hajec
*Assistant Examiner*—Thien M. Le
*Attorney, Agent, or Firm*—Dick and Harris

[57] ABSTRACT

An improved method for correcting errors in a sequence of digital audio data for use in a system having a compact disc player device and a digital signal processor. A compact disc player device reads a compact disc and outputs digital audio data as a series of digitized samples and detects erroneous samples. An error correction apparatus implements a finite impulse response filter. The method achieves a low level of interpolation error within the corrected output of the finite impulse response filter by assigning zero-valued filter coefficients to digital audio samples that are likely to be erroneous due to their proximity to a known erroneous digital audio sample.

5 Claims, 2 Drawing Sheets

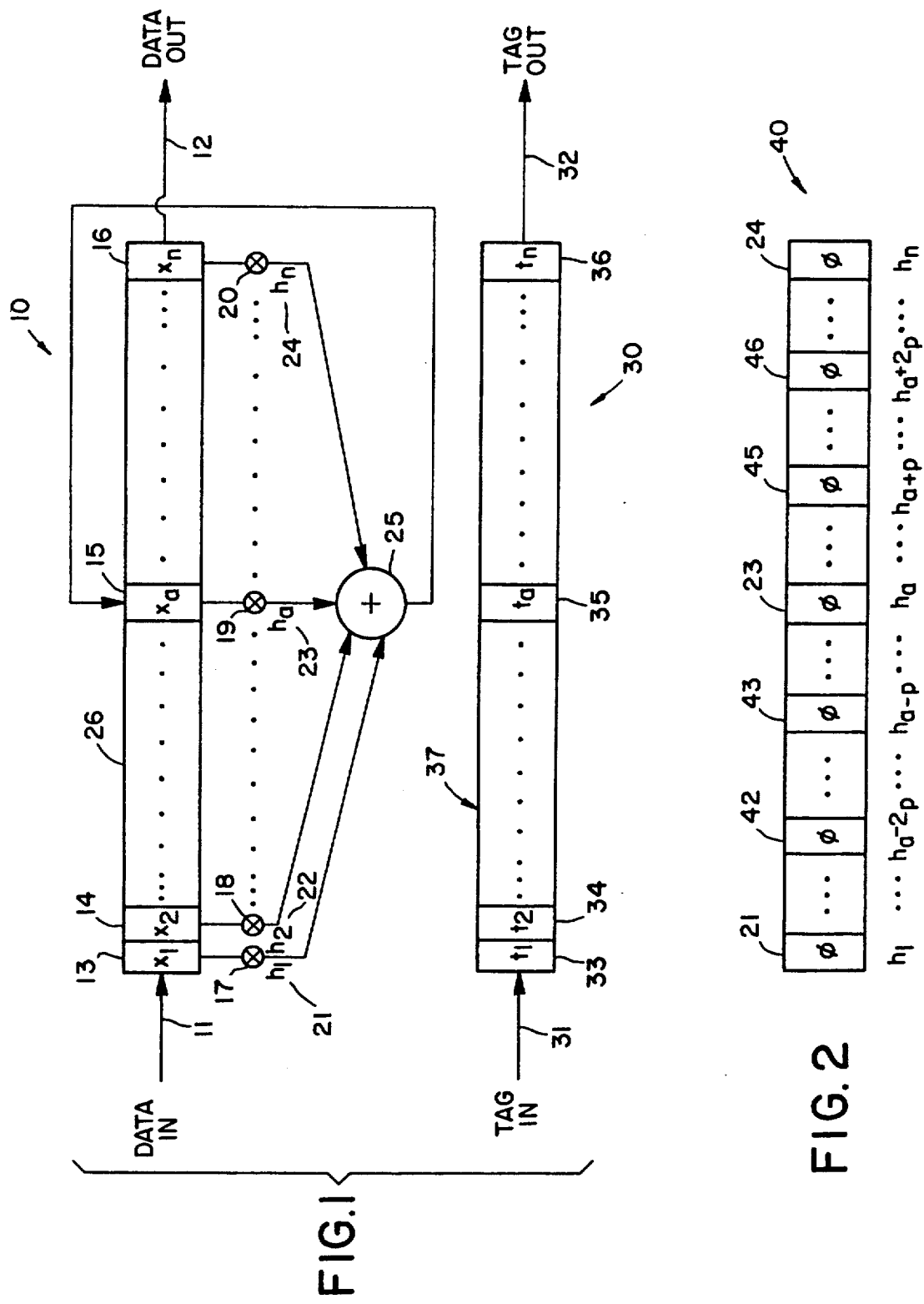

METHOD FOR CORRECTING ERRORS IN DIGITAL AUDIO DATA

BACKGROUND OF THE INVENTION

The present invention relates generally to a method for correcting errors in digital audio data, and in particular, to a method for implementing a finite impulse response filter having a sequence of filter coefficients which contains periodic zero-values.

Compact disc players have been in existence for many years. These players read a compact disc and output a sequence of digital audio data. Compact discs typically contain audio information in the form of digitized audio sample data, together with an error correction code, such as a Cross-Interleaved Reed-Solomon code. Most compact disc players use this error correction code in an attempt to correct any errors in the digitized audio samples read from the compact disc. Digitized audio samples with an excessive number of bit errors cannot be corrected using the associated error correction code. Accordingly, the sequence of digital audio data output from compact disc players generally contain a number of erroneous digital audio data samples.

In some cases an additional independent error correction apparatus is appended to the compact disc player in order to correct these excessively erroneous digital audio data samples. These error correction apparatuses generally employ some form of interpolation filter, such as a finite impulse response (FIR) filter, to correct erroneous digital audio data samples. Interpolation filters employ numerous samples surrounding each erroneous sample in an attempt to determine the correct value for the erroneous sample and replace the erroneous sample with a reconstructed value.

One problem with some prior art methods employing interpolation filters, such as FIR filters, is that some of the digital audio data samples surrounding the "known" erroneous sample may also be erroneous. Application of a interpolation filter which utilize these additional erroneous samples to reconstruct the current erroneous sample results in increased interpolation error in the output. In effect, the additional erroneous samples are "propagated into" the "corrected" value which is output from the interpolation filter.

Accordingly, it is an object of the present invention to provide a method for correcting errors in a sequence of digital audio data which minimizes the propagated error by employing a FIR filter which contains periodic zero-valued filter coefficients.

It is a further object of the present invention to provide a method for correcting errors in a sequence of digital audio data by employing a FIR filter containing periodic zero-valued filter coefficients, wherein the locations of the zero-valued coefficients correspond to the likely locations of the additional erroneous digital audio data samples.

These and other objects of the present invention will become apparent in light of the present specification and drawings.

SUMMARY OF THE INVENTION

The present invention comprises a method for correcting errors in a sequence of digital audio data. The sequence of digital audio data comprises a series of digitized samples of audio information read from a compact disc. This method may be used with a system with a compact disc player which reads a compact disc and outputs the sequence of digital audio data samples, together with an indication of whether a particular sample is erroneous; i.e., whether a particular sample is deleted or in error. This method may be used within a digital signal processor which implements a finite impulse response (FIR) filter having a digital data sample buffer containing the samples output from the disc player, and a plurality of filter taps and filter coefficients associated with a corresponding number of the samples stored within the sample buffer.

The method comprises creating a sequence of filter coefficients which contain periodic zero-values. The method further comprises locating an erroneous digital audio data sample. Two common approaches for creating filter coefficients are the windowed sin(x)/x approach and the Parks-McClellan approach. Moreover, commercially available computer software exists for implementing the Parks-McClellan approach, such as the FDAS filter design package marketed by Momentum Data Systems.

The sequence of sampled digital audio data stored within the sample buffer is applied to the FIR filter whenever a known erroneous digital audio sample is centered within the FIR filter. Operation of the FIR filter reconstructs the correct value for the erroneous digital audio data sample. The erroneous digital audio data sample is then replaced with the correct value from the FIR filter.

It has been observed by the inventor that when a sequence of digital audio data from compact disc contains an erroneous sample, additional erroneous samples tend to occur at regularly spaced intervals from the known erroneous sample. Thus, rote application of a FIR filter results in needlessly high interpolation errors, since the additional erroneous samples are propagated into the output from the FIR filter.

The use of a FIR filter employing a sequence of filter value coefficients containing zero-valued coefficients at positions corresponding to the likely positions of these additional erroneous samples reduces the likelihood that any of these additional erroneous samples will be propagated into the corrected value output from the FIR filter. Accordingly, the use of zero-valued coefficients at positions corresponding to the likely positions of additional erroneous samples results in reduced interpolation errors in the FIR filter output.

For digital audio samples output from a compact disc player, it has been observed that one or more additional erroneous samples tend to occur 32 samples, or a multiple of 32 samples, from a known erroneous sample. Accordingly, in a preferred embodiment of the present invention, a sequence of filter coefficients containing periodic zero-valued coefficients is created wherein the period, or spacing of zero-valued coefficients is equal to 32.

A sequence of zero-valued coefficients with zero-values at least every 32 samples can also be achieved by creating a sequence of zero-valued coefficients wherein the period of zero-valued coefficients is a whole number fraction of 32, such as 16 or 8. Accordingly, in another preferred embodiment of the present invention, a sequence of filter coefficients containing periodic zero-valued coefficients is created wherein the period of zero-valued coefficients is equal to a whole number fraction of 32.

BRIEF DESCRIPTION OF THE DRAWINGS

FIG. 1 is an illustration of the error correction apparatus, showing the finite impulse response filter and the error tag buffer;

FIG. 2 is an illustration of a sequence of filter coefficients containing periodic zero-valued coefficients.

DETAILED DESCRIPTION OF THE DRAWINGS

Figure 3:
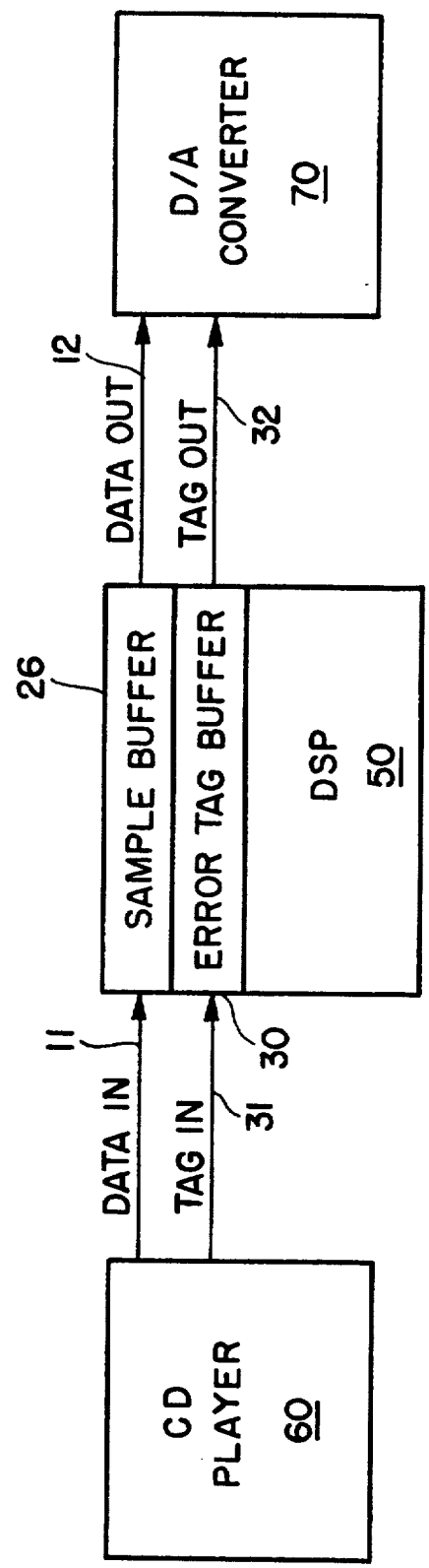
FIG. 3 is a block diagram of the major hardware components of the error correction apparatus and surrounding circuitry.

While this invention is susceptible in embodiment in many different forms, there is shown in the drawings and will herein be described in detail, several specific embodiments, with the understanding that the present disclosure is to be considered an exemplification of the principles of the invention and is not intended to limit the invention to the embodiments illustrated.

FIG. 1 shows a FIR filter 10 and error tag buffer 30 which may be implemented using a digital signal processor, 50 (as shown in FIG. 3). FIR filter 10 is comprised of data input path 11, data output path 12, digital data sample buffer 26, filter taps (including 17, 18, 19 and 20), and accumulator 25. Error tag buffer 30 comprises error tag input path 31, error tag data buffer 37 and error tag output path 32.

Digital data sample buffer 26 is shown storing a sequence of digital audio data samples received from a compact disc player 60 (as shown in FIG. 3) via data input path 11. Digital data sample buffer 26 is shown having length "n" wherein "n" is the length, or number of filter taps, of FIR filter 10. Digital data sample buffer 26 may of course be configured such that its length is greater than the number of taps of FIR filter 10, as may be desirable for timing and/or data stability concerns. Digital data sample buffer 26 is operated in a first-in, first-out manner. Each digital audio data sample received via data input path 11 is initially stored in digital data sample buffer 26 at position $x_1$ 13. As additional audio data samples are received and stored in digital data sample buffer 26, each digital audio data sample previously stored within digital data sample buffer 26 is "bubbled" or shifted to the next position within digital data sample buffer 26. For example, the digital audio data sample at position $x_1$ 13 is shifted to position $x_2$ 14. The digital audio data sample at position $x_n$ 16 is shifted entirely out of digital data sample buffer 26 onto data output path 12. Digital audio data samples output onto data output path 12 are subsequently converted into analog audio signals by a digital-to-analog converter 70 (as shown in FIG. 3) for playback to the user as audible sound.

Digital audio data sample $x_a$ 15 is in the center of the digital audio data samples stored within digital data sample buffer 26. Since there are an equal number of digital audio data samples on either side of $x_a$ 15, the length of FIR filter 10, "n", is an odd number. Accordingly, "a" is equal to $(((n-1)/2)+1)$.

Error tag buffer 30 stores a sequence of error tags received from a compact disc player via error tag input path 31. Each error tag is output from a compact disc player in association with a corresponding digital audio data sample. Each error tag indicates whether the corresponding digital audio data sample is valid or erroneous. Error tag buffer 30 is shown of length "n", wherein "n" is the length, or number of filter taps, of FIR filter 10. Error tag buffer 30 may of course be configured such that its length is greater than the number of taps of FIR filter 10, as may be desirable for timing and/or data stability concerns. Error tag buffer 30 is operated in a first-in, first-out manner, similar to digital data sample buffer 26. Each error tag received via error tag input path 31 is initially stored in error tag buffer 30 at position $t_1$ 33. As additional error tags are received and stored in error tag buffer 30, each error tag previously stored within error tag buffer 30 is shifted to the next position within error tag buffer 30. For example, the error tag at position $t_1$ 33 is shifted to position $t_2$ 34. The error tag at position $t_n$ 36 is shifted entirely out of error tag buffer 30 onto error tag output path 32. Error tags output onto error tag output path 32 may be employed in subsequent processing of the digital audio data samples, including an digital-to-analog conversion process (not shown).

Error tag $t_a$ 35 is in the center of the error tags stored within error tag buffer 30. Since there are an equal number of error tags on either side of $t_a$ 35, the length of FIR filter 10, "n", is an odd number. Accordingly, "a" is equal to $(((n-1)/2)+1)$.

FIR filter 10 further comprises a number of taps, including taps 17, 19 and 20, equal to the length of FIR filter 10. Each tap can be thought of as a multiplier circuit with two inputs. FIR filter 10 further includes a plurality of filter coefficients, including coefficients $h_1$ 21, $h_2$ 22, $h_a$ 23, and $h_n$ 24. The actual number of filter coefficients corresponds to the number of taps in FIR filter 10. There is also a corresponding digital audio data sample from digital data sample buffer 26 input into the plurality of taps. For example, digital audio data sample $x_a$ 15 and filter coefficient $h_a$ 23 are both inputs to tap 19. Thus, when FIR filter 10 is operated, each tap outputs the product of its corresponding digital audio data sample and coefficient.

FIR filter 10 further includes accumulator 25. Accumulator 25 sums the output of all "n" filter taps. The output of accumulator 25 is the corrected value for the digital audio data sample at the center of the FIR filter, $x_a$ 15. This corrected value is written into digital data sample buffer 26, replacing, or overwriting the previously erroneous digital audio data sample.

In the present invention, a sequence of filter coefficients which contains periodic zero-values is created, such as is shown in FIG. 2 The length of the sequence, denoted "n" corresponds to the number of taps in FIR filter 10. The period, or spacing of the zero-valued filter coefficients is denoted "p". Filter coefficient $h_a$ 23 is the center coefficient, which is utilized in center tap 23 having its second input being the known erroneous digital data sample. Since there are an equal number of filter coefficients on either side of $h_a$ 23, the length of the FIR filter, "n", is an odd number. Accordingly, "a" is equal to $(((n-1)/2)+1)$.

For a given period "p", a sequence of filter coefficients is created with a zero-values center coefficient $h_a$ 23, and subsequent zero-valued coefficients repeating at regular intervals of "p" extending out from center coefficient $h_a$ 23 in both directions. For example, the sequence of filter coefficients also contains zero-valued coefficients at $h_{a+p}$ 45, $h_{a-p}$ 43, $h_{a+2p}$ 46, and $h_{a-2p}$ 42. The zero-valued coefficients periodically repeat starting from the center coefficient $h_a$ 23 until the end-point coefficients, $h_1$ 21 and $h_n$ 24, are reached.

It has been observed that when a sequence of digital audio data output from a compact disc player contains an erroneous sample, additional erroneous samples tend to occur at regularly spaced intervals from the known erroneous sample. For digital audio samples output from a compact disc player, it has been observed that additional erroneous samples often occur 32 samples, or a multiple of 32 samples, from a known erroneous sample. Thus, an erroneous digital audio data sample at position $x_a$ 15 (shown in FIG. 1) would be "surrounded" by additional erroneous digital audio data samples at positions $x_{a+32}$, $x_{a-32}$, $x_{a+64}$, and $x_{a-64}$ (not shown). The application of FIR filter without zero-valued coefficients corresponding to these additional erroneous digital audio data samples would result in needlessly high interpolation errors, since the additional erroneous samples are propagated into the corrected value output from FIR filter 10.

The use of FIR filter 10 while employing a sequence of filter value coefficients which contain zero-valued coefficients at positions corresponding to the likely positions of additional erroneous samples reduces the likelihood that additional errors will be propagated into the FIR filter output. Zero-valued coefficients result in zero outputs from their corresponding taps. Thus by placing zero-valued coefficients at likely positions of additional erroneous samples the erroneous samples do not contribute to the FIR filter output and therefore to additional interpolation error. Accordingly, this results in corrected values output from the FIR filter having reduced interpolation errors. In the previous example, a sequence of filter coefficients with zero-valued coefficients at positions $h_a$ 23, $h_{a+32}$, $h_{a-32}$, $h_{a+64}$, and $h_{a-64}$ would result in reduced interpolation errors, since the erroneous digital audio data samples corresponding to the zero-valued coefficients would not be propagated into the corrected output of the FIR filter. Accordingly, in a preferred embodiment of the present invention, a sequence of filter coefficients containing periodic zero-valued coefficients is created wherein the period, or spacing of zero-valued coefficients is equal to 32.

A sequence containing zero-valued coefficients with zero-values at least every 32 samples can also be achieved by creating a sequence containing zero-valued coefficients wherein the period of zero-valued coefficients is a whole number fraction of 32, such as 16 or 8. Accordingly, in a preferred embodiment of the present invention, a sequence of filter coefficients containing periodic zero-valued coefficients is created wherein the period of zero-valued coefficients is equal to a whole number fraction of 32.

Additionally, the use of a smaller period may also result in an even lower interpolation error, since the data samples corresponding to some of the additional zero-valued coefficients may also be erroneous. Compact disc players send sample data from a compact disc at a rate of 44.1 kHz. According to Nyquist's sampling theorem, the highest analog frequency which can be reconstructed from this sampling rate is one-half of the sampling rate, or 22.05 kHz. Audio data on compact discs, however, are bandwidth limited to 20 kHz in the manufacturing process. Accordingly, the sequence of digital audio data samples read from a compact disc contains a certain amount of redundant information, equal to:

$$\frac{22.05 \text{ kHz} - 20 \text{ kHz}}{22.05 \text{ kHz}}$$

or approximately one-eleventh of the samples. Therefore, periodic zero-valued coefficients can be assigned to fewer than one out of every eleventh digital audio sample without a resultant increase in the interpolation error in the corrected value output from the FIR filter. For whole number fractions of 32, only a period of 16 is less frequent than the one out of every eleventh sample threshold. Accordingly, in a preferred embodiment of the present invention, a sequence of filter coefficients containing periodic zero-valued coefficients is created wherein the period of zero-valued coefficients is equal to 16.

In operation, a sequence of filter coefficients which contains periodic zero-valued coefficients is created. The length of the sequence, in part a function of the periodicity of zero-valued coefficients, corresponds to "n" the length of the FIR filter. These coefficients, designated $h_1$ 21 through $h_n$ 24, are sequentially assigned to taps within FIR filter 10. Digital audio sample data received from the CD player (not shown) is continuously fed into digital data sample buffer 26. Error tags received from the CD player are also continuously fed into error tag buffer 30 in such a way that each digital audio sample datum remains aligned with its associated error tag. The center position of error tag buffer 30, position $t_a$ 35, is continuously monitored. Whenever the error tag $t_a$ 35 within this center position indicates that the corresponding digital audio data sample in the center position of digital data sample buffer 26, position $x_a$ 15 is erroneous, the FIR filter is executed.

Whenever the FIR filter is executed, the sequence of sampled digital audio data stored within digital data sample buffer 26 is applied to FIR filter 10, with the erroneous digital audio data sample $x_a$ 15 centered within FIR filter 10. At each tap of FIR filter 10, the digital audio data sample associated with the tap is multiplied by the filter coefficient associated with the tap. Accumulator 25 sums the outputs of all "n" taps of length-n FIR filter 10. The output of accumulator 25 is deemed to be the reconstructed correct value for the erroneous digital audio data sample centered within FIR filter 10 at position $x_a$ 15 at the time interpolation began. This reconstructed correct value is finally written into digital data sample buffer 26 such that it replaces the erroneous digital audio data sample. Finally, the error tag associated with the previously erroneous sample is modified to indicate that its associated digital audio data sample contains a valid, rather than an erroneous sample.

The application of the present invention to a single channel of digital audio data has been described above. Typically, compact disc players output two-channels simultaneously. For each channel, these players output a separate sequence of digital audio data, along with a corresponding sequence of error tags. Thus, an error correction apparatus will typically implement two identical FIR filters simultaneously, one for each channel output from a compact disc player. Accordingly, the present invention as described above will typically be applied simultaneously to two sequences of digital audio data output from a compact disc player.

What is claimed is:

1. A method for correcting errors in a sequence of digital audio data, where the sequence of digital audio data comprises a series of digitized samples of audio information read from a compact disc for use in a system having:

a compact disc player device which reads a compact disc, outputs the sequence of digital audio data samples, detects whether a sample in the sequence is erroneous and provides an indication of which samples are detected as erroneous, an error correction apparatus implementing a finite impulse response filter having a digital data sample buffer containing a plurality of samples, a plurality of filter taps and filter coefficients associated with a corresponding number of samples stored within the sample buffer, the method for correcting errors comprising the steps of:

a. creating a sequence of filter coefficients with periodic zero-values, the period of the zero-valued coefficients corresponding to likely positions of additional erroneous digital audio data samples surrounding a digital audio data sample detected as erroneous:

b. locating an erroneous digital audio data sample;

c. applying the sequence of sampled digital audio data stored within the digital data sample buffer to the finite impulse response filter upon the erroneous digital audio data sample being centered within the finite impulse response filter toward reconstructing the correct value for the erroneous digital audio data sample; and d. replacing said erroneous digital audio data sample in the digital data sample buffer with the correct valve from the finite impulse response filter.

2. The invention according to claim 1 in which the step of creating a sequence of filter coefficients containing periodic zero-values comprises creating a sequence of filter coefficients with the period of zero-valued coefficients equal to 32.

3. The invention according to claim 1 in which the step of creating a sequence of filter coefficients containing periodic zero-values comprises creating a sequence of filter coefficients with the period of zero-valued coefficients equal to a whole number fraction of 32.

4. The invention according to claim 1 in which the step of creating a sequence of filter coefficients containing periodic zero-values comprises creating a sequence of filter coefficients with the period of zero-valued coefficients equal to 16.

5. The invention according to claim 3 in which the step of creating a sequence of filter coefficients containing periodic zero-values comprises creating a sequence of filter coefficients with the period of zero-valued coefficients equal to 16.

* * * * *